(12) United States Patent
Way

(10) Patent No.: US 8,967,535 B2
(45) Date of Patent: Mar. 3, 2015

(54) AIRCRAFT LANDING GEAR

(75) Inventor: Simon Way, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 13/544,674

(22) Filed: Jul. 9, 2012

(65) Prior Publication Data

US 2013/0026291 A1 Jan. 31, 2013

(30) Foreign Application Priority Data

Jul. 28, 2011 (GB) .................................. 1113030.9

(51) Int. Cl.
*B64C 25/10* (2006.01)
*B64C 25/12* (2006.01)
*B64C 25/16* (2006.01)

(52) U.S. Cl.
CPC ................. *B64C 25/12* (2013.01); *B64C 25/16* (2013.01)
USPC .................................... 244/102 R; 244/102 A

(58) Field of Classification Search
USPC ................................ 244/102 R, 102 A, 103 R
See application file for complete search history.

(56) References Cited

U.S. PATENT DOCUMENTS

| 2,156,773 | A | * | 5/1939 | Sikorsky | 244/102 R |
|---|---|---|---|---|---|
| 2,399,218 | A | * | 4/1946 | Felburg | 244/102 R |
| 2,403,835 | A | * | 7/1946 | Villepigue | 244/102 R |
| 2,452,787 | A | * | 11/1948 | Patch | 244/102 R |
| 2,538,878 | A | * | 1/1951 | Misulis | 244/102 R |
| 2,552,843 | A | * | 5/1951 | Clifton et al. | 244/102 R |
| 2,724,566 | A | * | 11/1955 | Troendle | 244/102 R |
| 2,772,060 | A | * | 11/1956 | Bendicsen | 244/102 SL |
| 2,869,806 | A | * | 1/1959 | Beach | 244/102 R |
| 3,393,883 | A | * | 7/1968 | Smith et al. | 244/102 R |
| 3,485,464 | A | * | 12/1969 | Jervan | 244/102 R |
| 3,687,400 | A | * | 8/1972 | Fitzgerald et al. | 244/102 R |
| 4,568,045 | A | * | 2/1986 | Mayer | 244/102 R |
| 4,573,649 | A | * | 3/1986 | Yourkowski et al. | 244/102 R |
| 5,000,400 | A | * | 3/1991 | Stuhr | 244/102 R |
| 6,027,070 | A | * | 2/2000 | Zambelli | 244/102 R |
| 6,464,168 | B1 | * | 10/2002 | Swannell et al. | 244/102 A |
| 6,854,689 | B1 | * | 2/2005 | Lindahl et al. | 244/102 R |
| 6,942,182 | B2 | * | 9/2005 | Quayle | 244/102 R |
| 7,093,795 | B2 | * | 8/2006 | Lindahl et al. | 244/102 R |
| 7,216,830 | B2 | * | 5/2007 | Quayle et al. | 244/15 |
| 7,475,849 | B2 | * | 1/2009 | Lindahl et al. | 244/102 A |
| 7,810,755 | B2 | * | 10/2010 | Reynes | 244/104 FP |
| 2006/0027706 | A1 | * | 2/2006 | Lindahl et al. | 244/102 R |
| 2008/0191090 | A1 | * | 8/2008 | Chow et al. | 244/102 R |
| 2008/0277525 | A1 | * | 11/2008 | Reynes | 244/102 R |

(Continued)

OTHER PUBLICATIONS

UK Search Report for GB Application No. 1113030.9, dated Nov. 6, 2011.

*Primary Examiner* — Tien Dinh
*Assistant Examiner* — Steven Hawk
(74) *Attorney, Agent, or Firm* — Nixon & Vanderhye P.C.

(57) ABSTRACT

A method, apparatus and computer program enable asymmetric deployment or retraction of aircraft landing gear. The landing gear includes landing gear doors which, when open extend over the aircraft centerline in order to provide room for deployment of the respective landing gear. To avoid interference between adjacent landing gear doors, the sequence of opening and/or closing of the landing gear doors is staggered. One gear door is opened and that landing gear is deployed, but prior to the adjacent door being opened, the first opened door is at least partially closed so as to not interfere with the fully opened position of the second door.

15 Claims, 5 Drawing Sheets

(56) References Cited

U.S. PATENT DOCUMENTS

2008/0308672 A1* 12/2008 Lindahl et al. ............ 244/102 A
2009/0078821 A1 3/2009 Chow et al.
2010/0006696 A1 1/2010 Chow et al.
2010/0155529 A1 6/2010 Chow et al.

* cited by examiner

_US 8,967,535 B2_

AIRCRAFT LANDING GEAR

This application claims priority to GB Application No. 1113030.9 filed 28 Jul. 2011, the entire contents of which is hereby incorporated by reference.

FIELD OF INVENTION

The present invention relates to aircraft landing gear.

BACKGROUND OF THE INVENTION

Stowable aircraft landing gear are stored in their stowed position in landing gear bays within the aircraft wing or fuselage or combination thereof. In many aircraft, the space within the wing or fuselage is limited resulting in a need for the landing gear to occupy as small a space as possible. Landing gear bays are commonly closed by a door or combination of doors. To deploy landing gear the bay doors are first opened and the landing gear is then lowered. Once the landing gear is fully deployed some or all of the bay doors may be closed to improve the aerodynamics or ground clearance of the aircraft. The landing gear retraction operation is the reverse of the deployment operation.

One problem is that as the wheels of the landing gear pass the corresponding open bay door during extension or retraction a high degree of aerodynamic interference occurs which increases stresses on the landing gear and bay door structures and is also associated with undesirable noise, vibration and aerodynamic drag.

SUMMARY OF THE INVENTION

Embodiment of the invention provide a method for operating a stowable landing gear system for an aircraft, the landing gear system comprising starboard landing gear and corresponding starboard door and port landing gear and corresponding port door, the landing gears being located adjacent each other either side of the aircraft centreline and each arranged to deploy by outward rotation away from the centreline and the doors each being arranged to open towards the centreline, the method comprising the steps of:
  first opening one of the port or starboard doors and deploying the corresponding one of the port or starboard landing gear and then closing the opened port or starboard door; and
  second opening the other of the port or starboard doors and deploying the corresponding one of the port or starboard landing gear and then closing the opened port or starboard door.

The doors may each be arranged to open to a position in which each door extends at least partially over the aircraft centreline. The doors may each be arranged to open to a position in which each door extends at least partially underneath the other door in its respective closed position. The doors may each be arranged to open to a position in which each door extends at least partially over the hinge line of other door. Each door may be hinged on its inboard side. The hinge-line of each door may be adjacent the aircraft centreline. The centreline may comprise the central vertical plane running fore and aft through aircraft fuselage. The opening of the opened starboard or port door may be initiated prior to the completion of the closing of the opened port or starboard door.

Another embodiment provides stowable landing gear apparatus for an aircraft comprising starboard landing gear and corresponding starboard door and port landing gear and corresponding port door, the landing gears being located adjacent each other either side of the aircraft centreline and each arranged to deploy by outward rotation away from the centreline and the doors each being arranged to open towards the centreline, the apparatus being operable:
  first to open one of the port or starboard doors and deploy the corresponding one of the port or starboard landing gear and then close the opened port or starboard door; and
  second to open the other of the port or starboard doors and deploy the corresponding one of the port or starboard landing gear and then close the opened port or starboard door.

A further embodiment provides a computer program stored on a computer readable medium and loadable into the internal memory of a computer, comprising software code portions arranged, when the program is run on a computer, for performing a method for operating a stowable landing gear system for an aircraft, the landing gear system comprising starboard landing gear and corresponding starboard door and port landing gear and corresponding port door, the landing gears being located adjacent each other either side of the aircraft centreline and each arranged to deploy by outward rotation away from the centreline and the doors each being arranged to open towards the centreline, the method comprising the steps of:
  first opening one of the port or starboard doors and deploying the corresponding one of the port or starboard landing gear and then closing the opened port or starboard door; and
  second opening the other of the port or starboard doors and deploying the corresponding one of the port or starboard landing gear and then closing the opened port or starboard door.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
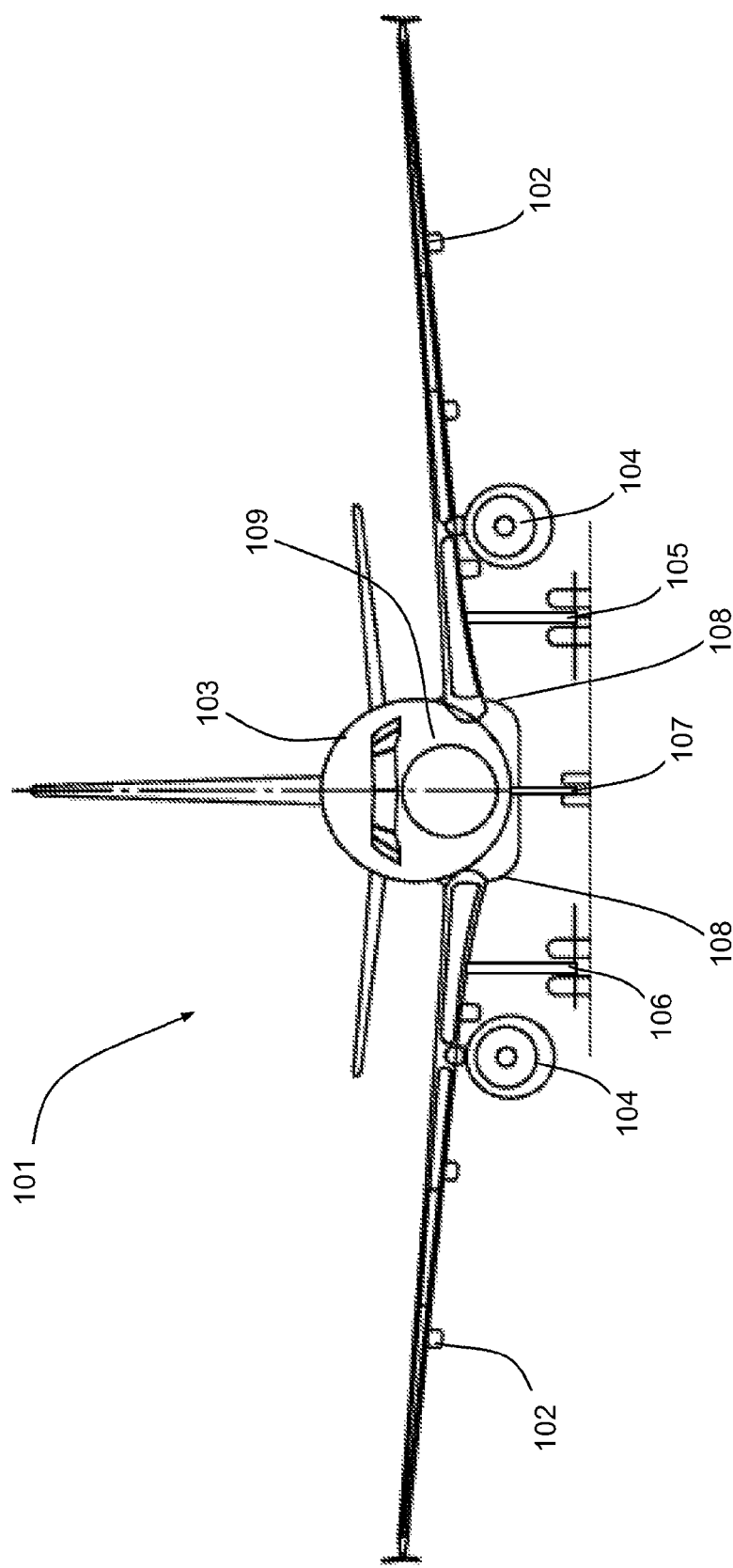
FIG. 1 is a schematic illustration of an aircraft.

With reference to FIG. 1, an aircraft 101 comprises a pair of wings 102 faired into a fuselage 103. Each of the wings 102 carries an engine 104. The aircraft 101 is supported on the ground by a landing gear system in the form of port landing gear 105, starboard landing gear 106 and a nose wheel 107. Each landing gear 105, 106, 107 is stowable in respective landing gear bays 108. The port and starboard landing gear 105, 106 are stowed in a respective bays provided within the root and centre box of the wings 102. In the present embodiment, the port and starboard landing gear 105, 106 form the main landing gear of the aircraft 101. The nose wheel 107 is provided with a bay in the nose of the fuselage 103. The landing gear system further comprises landing gear operation control system 109, which, in the present embodiment is a computerised system integrated with the aircraft control systems. The landing gear operation control system 109 is arranged, in response to a deployment or stowage command, to operate the landing gears 105, 106, 107 and respective bay doors (not shown) in a controlled and safe manner, providing appropriate feedback on the state of the landing gear to the aircraft systems.

Figure 2:
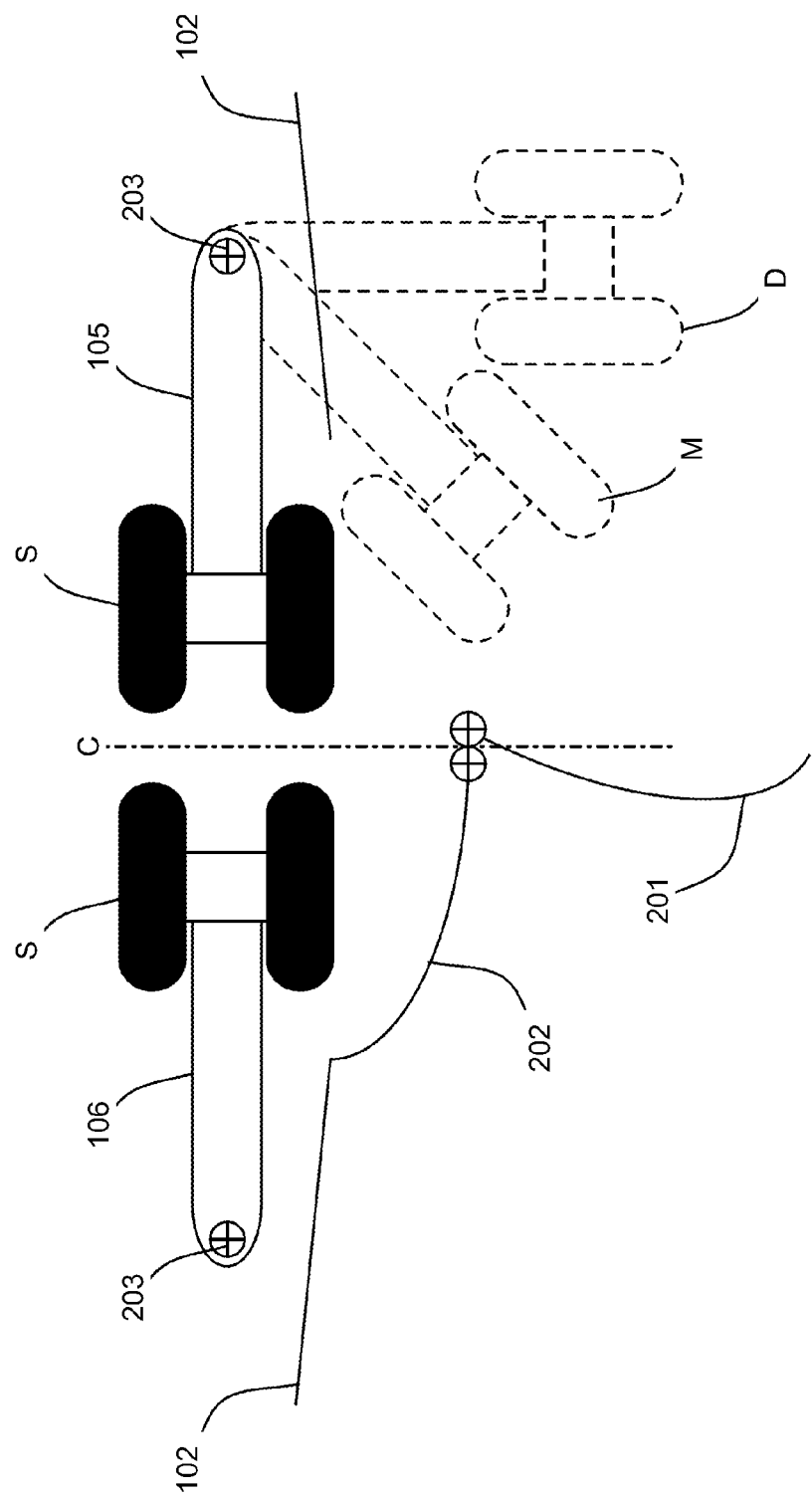
FIGS. 2 to 4 are cross-sectional schematic illustrations of the deployment of the landing gear in the aircraft of FIG. 1.

With reference to FIG. 2, in the present embodiment, the landing gear operation control system 109 is arranged to deploy the port and starboard landing gear 105, 106 asymmetrically. In other words, the operation to deploy one of either the port and starboard landing gear 105, 106 is completed before the commencement operation to deploy the other of the port and starboard landing gear 105, 106. The same asymmetric operation is applied to the stowage or retraction of the port and starboard landing gear 105, 106.

In the present embodiment, the main landing gear bay doors 201, 202 are hinged adjacent the centreline C of the aircraft 101. The centreline C comprises the central vertical plane running fore and aft through aircraft fuselage 103. The port and starboard landing gear 105, 106 and corresponding bays 108 are located adjacent each other either side of the aircraft centreline C. The port and starboard landing gear 105, 106 are each arranged to deploy by outward rotation away from the centreline C about their respective pivots 203. The bay doors 201, 202 are each arranged to open towards the centreline C. The bay doors 201, 202 are hinged on their respective inboard sides adjacent the centreline C. The bay doors 201, 202 are arranged to over extend in their opening movement as shown in FIG. 2 so that each door 201, 202 can be moved to an open position in which it extends at least partially underneath the other door 202, 201 in its respective closed position. In other words, the doors 201, 202 are each arranged to open to a position in which each door 201, 202 extends at least partially over the hinge line of other door 202, 201.

Figure 3:
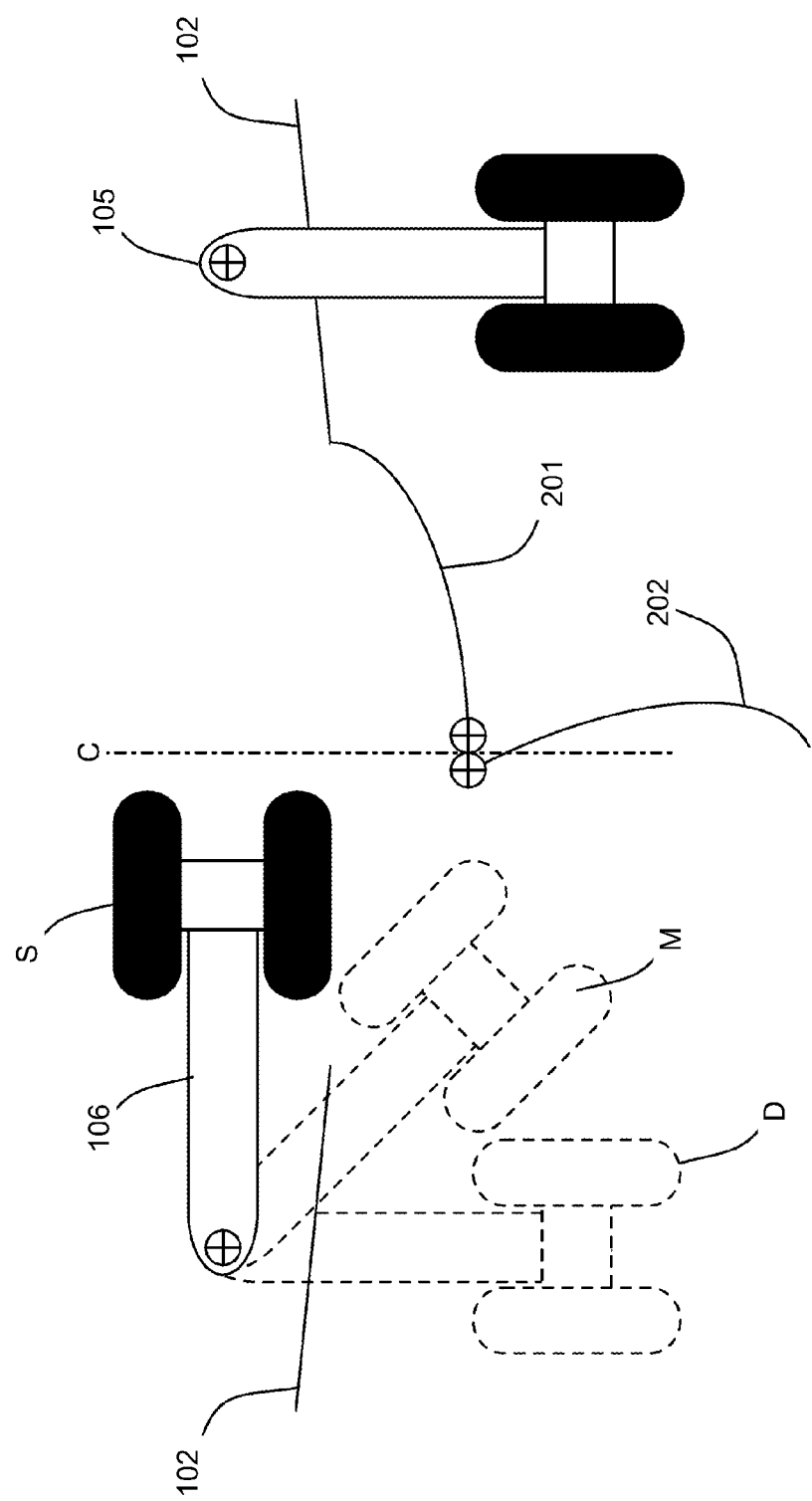
Figure 4:
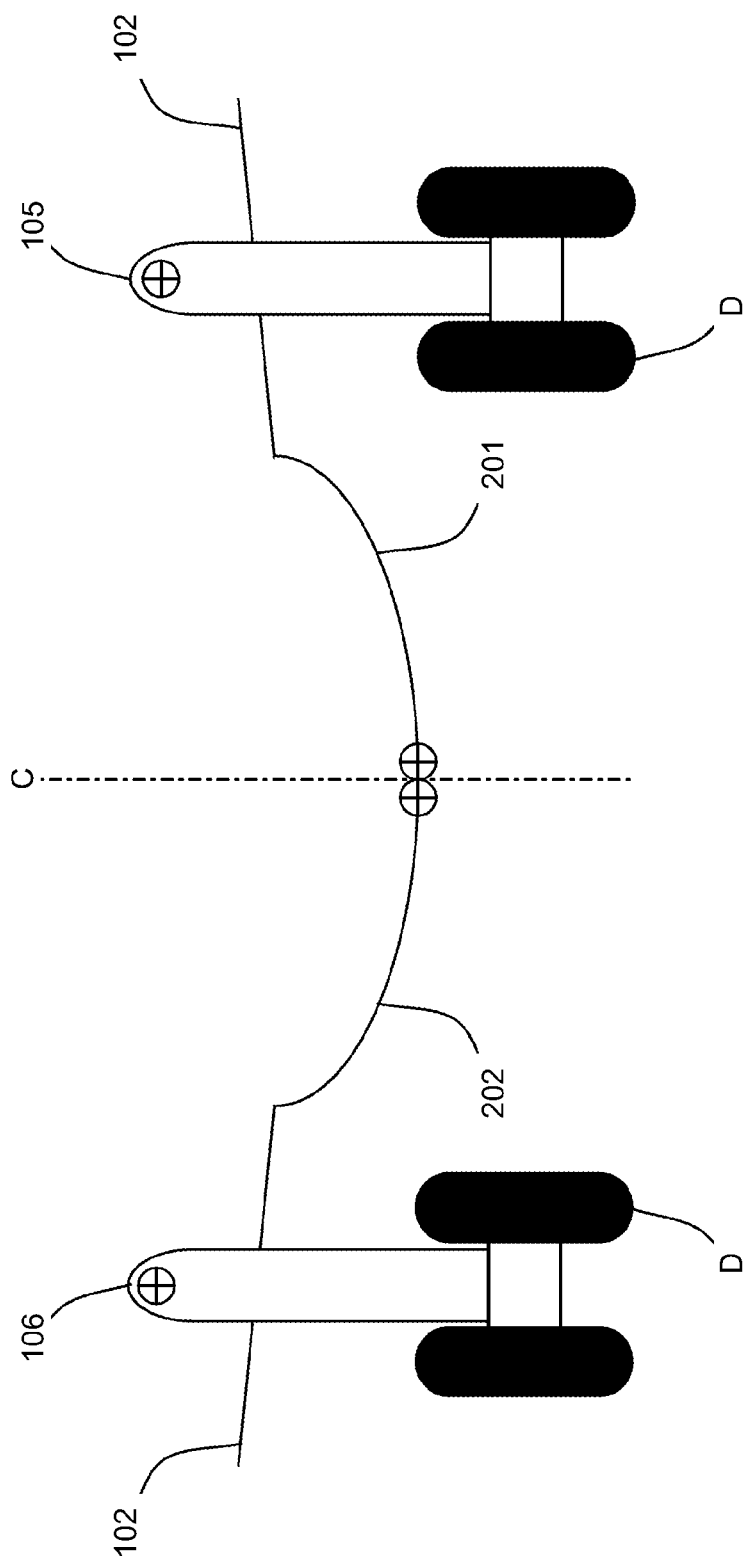

In the initial deployment operation illustrated in FIG. 2, the port bay door 201 is opened to its full open position and the port landing gear 105 is pivoted from its stowed position S to its deployed position D. With reference to FIG. 3, once the port landing gear 201 is in its deployed position D, the port bay door 201 is closed and the starboard bay door 202 is opened to its full open position. The port landing gear 106 is then pivoted from its stowed position S to its deployed position D. With reference to FIG. 4, once the starboard landing gear 202 is in its deployed position D, the starboard bay door 202 is closed and the main landing gear is ready for landing.

With reference to FIGS. 2 and 3, each landing gear 105, 106 is operable between its stowed position S and its deployed position D though a respective middle position M. At or around the middle position M each landing gear 105, 106 is positioned away from the respective bay door 201, 202 thus reducing the aerodynamic interference that would otherwise be caused by close proximity of landing gear to bay doors. Such spacing of the landing gear 105, 106 from the respective bay doors 201, 202 is enabled, in the present embodiment, by the combination of the over-extension of the bay doors 201, 202 and asymmetric deployment or stowing operations of the landing gear.

Figure 5:
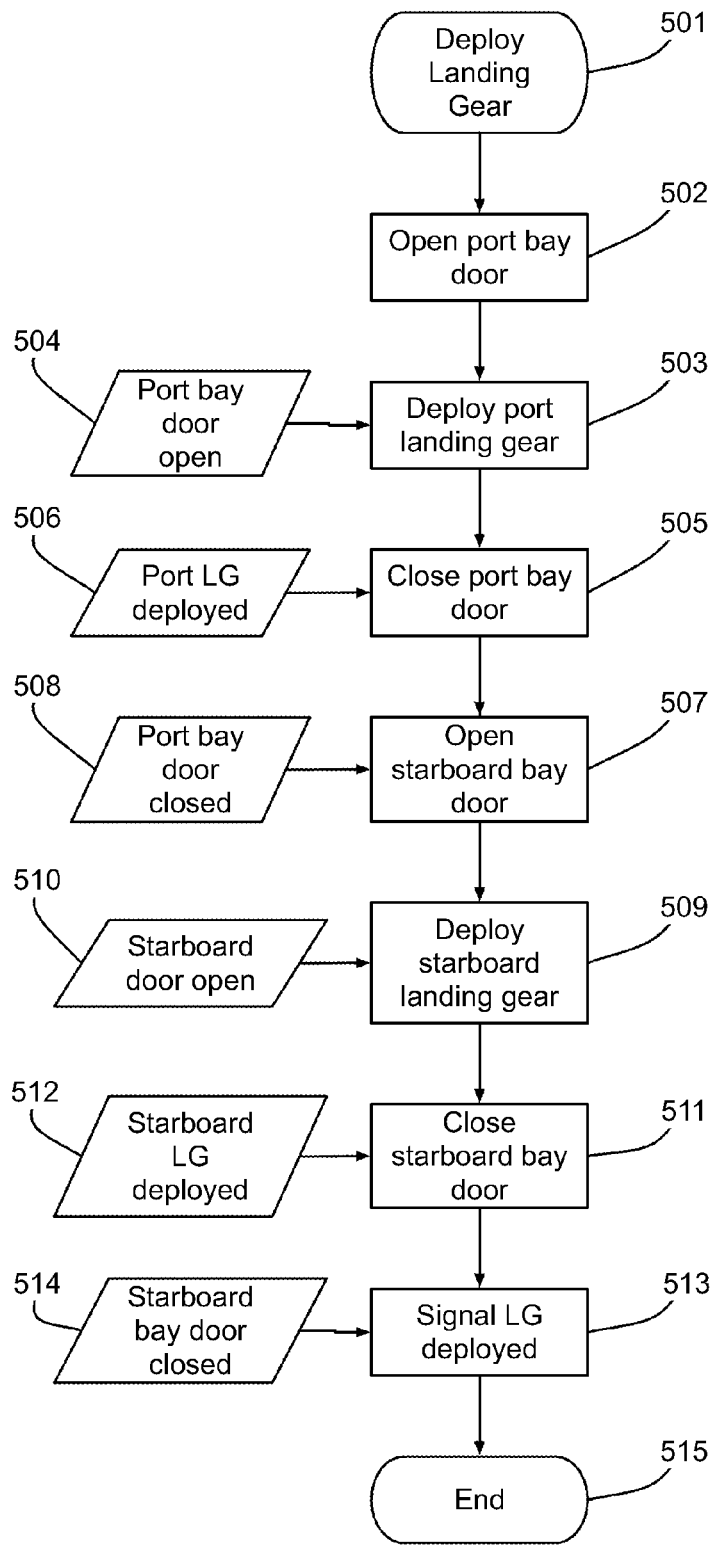
FIG. 5 is a flow chart illustrating processing performed by a landing gear control system during the deployment operation of FIGS. 2 to 4.

The processing performed by the landing gear operation control system 109 will now be described further with reference to the flow chart of FIG. 5. Processing is initiated at step 501 in response to a landing gear deployment instruction and processing then moves to step 502. At step 502 the port bay door 201 is opened and processing moves to step 503. A step 503 processing awaits a sensor input 504 indicating that the port bay door 201 is open before initiating the deployment of the port landing gear 105 and processing then moves to step 505. At step 505 processing awaits a sensor input 506 indicating that the port landing gear 105 has been deployed before initiating the closing of the port bay door 201 and processing then moves to step 507. At step 507 processing awaits a sensor input 508 indicating that the port bay door 201 is closed before initiating the opening of the starboard bay door 202 and processing then moves to step 509. At step 509 processing awaits a sensor input 510 indicating that the starboard bay door 202 is open before initiating the deployment of the starboard landing gear 106 and processing then moves to step 511. At step 511 processing awaits a sensor input 512 indicating that the starboard landing gear 106 has been deployed before initiating the closing of the starboard bay door 202 and processing then moves to step 513. At step 513 processing awaits a sensor input 514 indicating that the starboard bay door 202 is closed before signalling to the aircraft systems that the main landing gear 105, 106 is deployed. Processing then moves to step 515 and ends.

The processing performed by the landing gear operation control system 109 for the retraction operation is the reverse of the deployment operation described above with reference to FIG. 5.

In another embodiment, the landing gear operation control system 109 is arranged to be operable in two modes. In a first mode the landing gear operation control system 109 is arranged to deploy the landing gear asymmetrically as described above with reference to FIG. 5. In a second mode the landing gear operation control system 109 is arranged to deploy the landing gear symmetrically, that is, deploying both landing gears 105, 106 simultaneously. The aircraft pilot or other operator performs the selection of the mode of operation. The second mode may be selected when full landing gear deployment is required quickly or during free-fall of the landing gear in a failure case.

In aircraft embodying the invention, where only one bay door or landing gear is deployed at a time, the load on the hydraulic system of the aircraft to drive the actuators is lower than in a symmetric landing gear operation when two door actuators or landing gear actuators simultaneously. Thus the peak loading on the relevant hydraulics systems is reduced.

In another embodiment, during asymmetric landing gear deployment, once one of the landing gears has deployed and before its corresponding door has closed, the door for the other landing gear is opened. In other words, the closing and opening operations of the respective bay doors are performed at least partially simultaneously. The stowing operation may comprise the same at least partial simultaneous or interleaved bay door operation. Such at least partial simultaneous or interleaved bay door operation speeds up the asymmetric deployment or stowing operations of the landing gear.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples shown and described. Accordingly, departures may be made from such details without departure from the scope of applicant's general inventive concept.

The invention claimed is:

1. A method for operating a stowable landing gear system for an aircraft, said landing gear system comprising starboard landing gear and corresponding starboard door and port landing gear and corresponding port door, said landing gears located adjacent each other on adjacent sides of the aircraft centreline and each landing gear configured to deploy by outward rotation away from said centreline and said doors each configured to open towards and at least partially extend over said centerline when open, said method comprising the steps of:

opening one of said doors and deploying the corresponding one of said landing gear and then at least partially closing said opened door before opening the other of said doors and deploying the corresponding other of said landing gear and then closing said other of said doors.

2. A method according to claim 1 in which said doors are each arranged to open to a position in which each said door extends at least partially underneath the other door in respective closed positions.

3. A method according to claim 1 in which said doors are each arranged to open to a position in which each said door extends at least partially over the hinge line of the other of said doors.

4. A method according to claim 1 in which each said door is hinged on an inboard side.

5. A method according to claim 1 in which the hinge-line of each said door is adjacent said aircraft centreline.

6. A method according to claim 1 in which said centreline comprises the central vertical plane running fore and aft through aircraft fuselage.

7. A method according to claim 1 in which opening of said other of said doors is initiated prior to the completion of said closing of said first opened one of said doors.

8. A stowable landing gear apparatus for an aircraft comprising starboard landing gear and corresponding starboard door and port landing gear and corresponding port door, said landing gears located adjacent each other on adjacent sides of the aircraft centreline and each landing gear configured to deploy by outward rotation away from said centreline and said doors each configured to open towards and at least partially extend over said centreline, said apparatus comprising:

means for opening one of said doors and for deploying the corresponding one of said landing gear and then for at least partially closing said opened door; and means for opening the other of said doors after partially closing said opened door and for deploying the corresponding one of said landing gear and then for closing said other of said doors.

9. Apparatus according to claim 8 in which said doors are each arranged to open to a position in which each said door extends at least partially underneath the other door in respective closed positions.

10. Apparatus according to claim 8 in which said doors are each arranged to open to a position in which each said door extends at least partially over the hinge line of the other of said doors.

11. Apparatus according to claim 8 in which each said door is hinged on an inboard side.

12. Apparatus according to claim 8 in which the hinge-line of each said door is adjacent said aircraft centreline.

13. Apparatus according to claim 8 in which said centreline comprises the central vertical plane running fore and aft through aircraft fuselage.

14. Apparatus according to claim 8 in which opening of said other of said doors is initiated prior to the completion of said closing of said first opened one of said doors.

15. A computer program stored on a non-transitory computer readable storage medium and loadable into the internal memory of a computer, said program when run on a computer, performs the method of claim 1.

* * * * *